United States Patent [19]

Marcantonio et al.

[11] 4,061,039

[45] Dec. 6, 1977

[54] LOCOMOTIVE SPEED RECORDER SYSTEM

[75] Inventors: Livio F. Marcantonio, Utica; Marcel P. D'Haem, New Hartford, both of N.Y.

[73] Assignee: Chicago Pneumatic Tool Company, New York, N.Y.

[21] Appl. No.: 674,861

[22] Filed: Apr. 8, 1976

[51] Int. Cl.² .......................... G01P 1/04; G01P 1/06
[52] U.S. Cl. ........................ 73/489; 73/528; 346/33 D
[58] Field of Search ............... 73/489, 498, 527, 528, 73/2; 346/18, 33 D; 74/12

[56] References Cited

U.S. PATENT DOCUMENTS

| | | | |
|---|---|---|---|
| 1,039,425 | 9/1912 | Maxwell | 74/12 |
| 1,380,510 | 6/1921 | Yoshinaga | 346/18 X |
| 1,553,957 | 9/1925 | Patterson | 74/12 |
| 1,712,955 | 5/1929 | Gustafson | 74/12 |
| 2,210,154 | 8/1940 | Stevens et al. | 73/523 |
| 3,295,356 | 1/1967 | Fata | 73/528 |
| 3,786,512 | 1/1974 | McCue et al. | 346/33 D |

FOREIGN PATENT DOCUMENTS

| | | | |
|---|---|---|---|
| 621,340 | 2/1927 | France | 73/519 |
| 6,836 of | 1911 | United Kingdom | 73/527 |

*Primary Examiner*—James J. Gill
*Attorney, Agent, or Firm*—Stephen J. Rudy

[57] ABSTRACT

A locomotive speed recorder system having a gear train drive operable off the drive wheel of a locomotive, in which system a pneumatically operable cam bar is provided for disengaging the gear train drive so as to deactivate the recorder during dead-head engine runs. A changeable gear train is utilized to effect drive wheel wear compensation; and a right angle drive from the drive wheel incorporates reduction gearing to reduce wear of a flexible cable connecting the right angle drive with the recorder.

12 Claims, 8 Drawing Figures

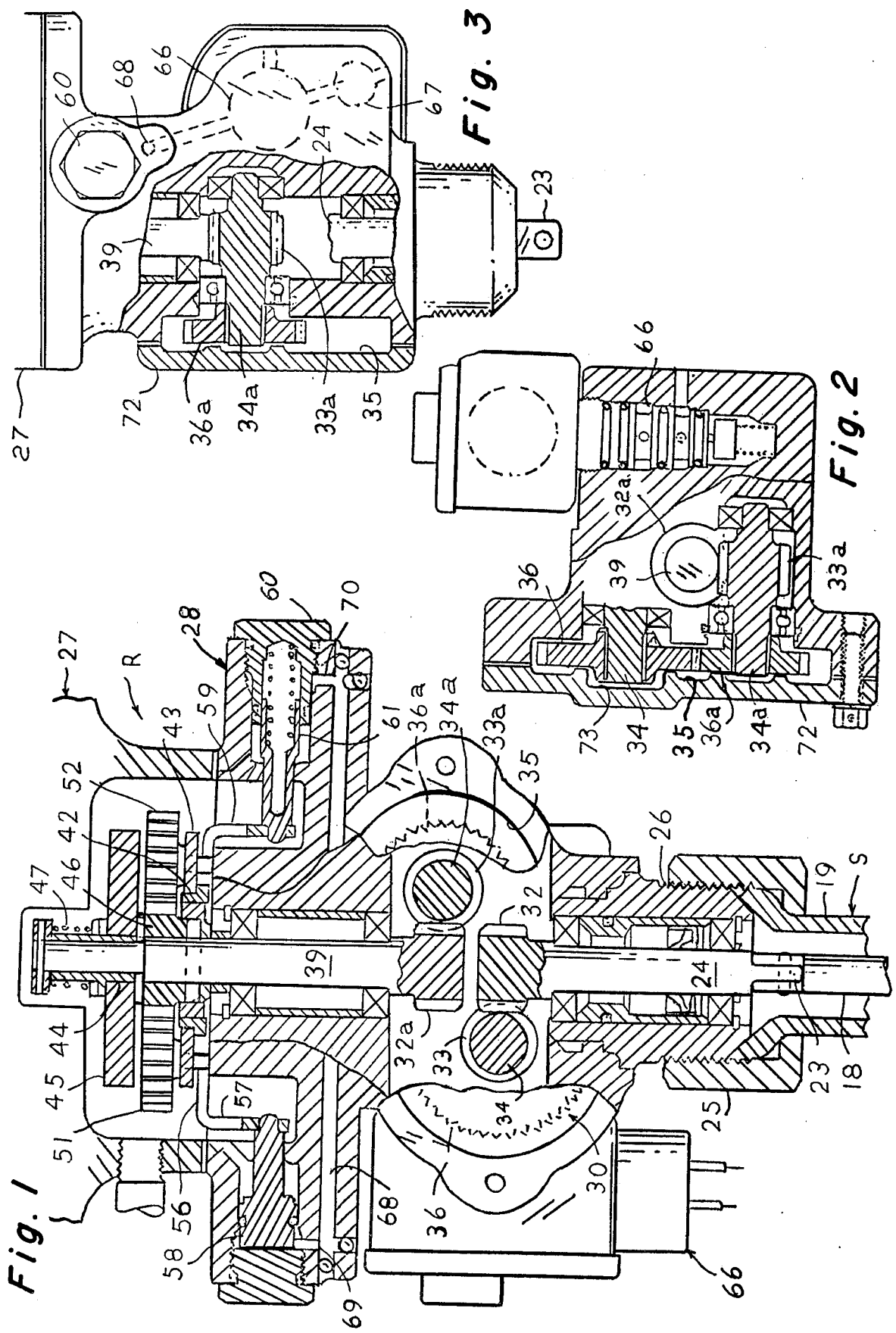

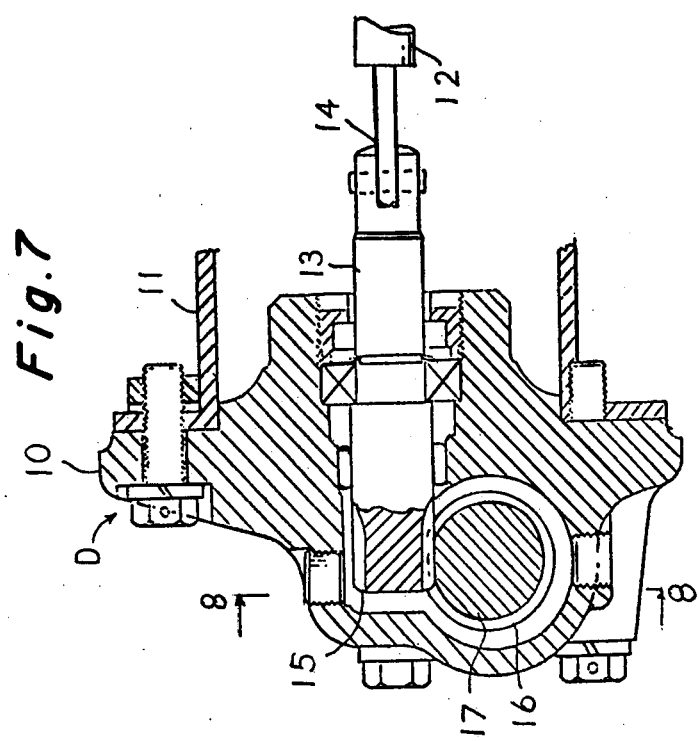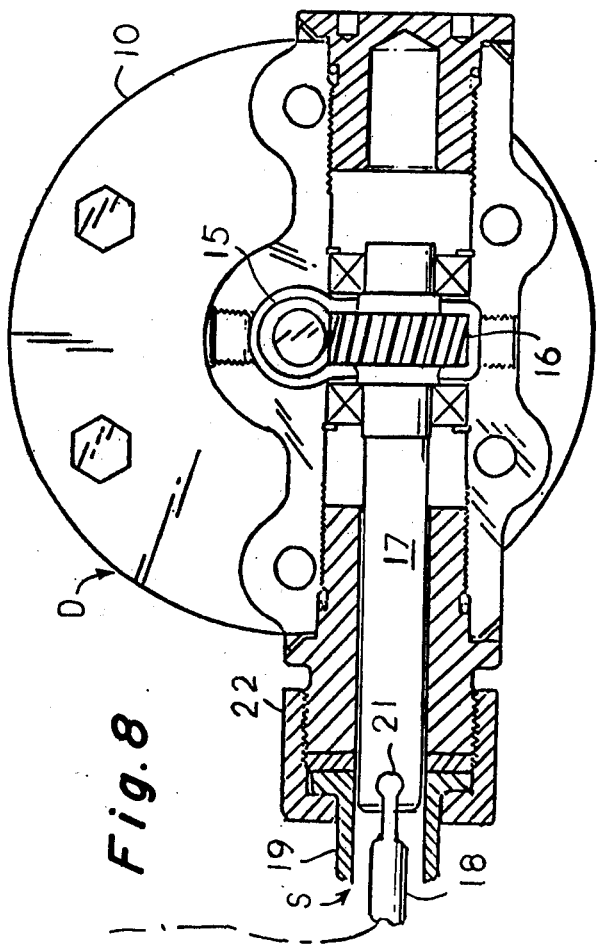

LOCOMOTIVE SPEED RECORDER SYSTEM

BACKGROUND OF THE INVENTION

This invention is directed to improvements in speed recorders for railroad locomotives.

More particularly it is directed to improving the speed recorder system disclosed in U.S. Pat. No. 2,210,154. The latter patent describes a system in which an hydraulic speed recorder is operatively associated with a drive wheel of a locomotive. The device operates to record speed not only when the locomotive is running in a lead position in a forward or reverse direction, but also operates to record speed when the locomotive is not running in a lead position, as when it is operating in a power source mode or riding dead-head behind the lead locomotive in a consist of multiple engines. Operation of the recorder when the locomotive is operating in the latter mode serves no useful purpose, since the recording is not utilized. Accordingly, such recorder operation wastes recorder paper charts, and increases maintenance problems. A feature of the present invention is an arrangement for deactivating the recorder to a non-operating condition during such periods.

Another feature of the invention is a reduction gearing arrangement for transmitting the drive of the locomotive wheel through a flexible cable to the recorder, whereby the life of the flexible cable is prolonged.

A further feature of the invention is a gear box arrangement at the recorder whereby a quick and simple means is provided for gear change capability in the drive transmission train at the recorder to compensate for locomotive drive wheel wear.

BRIEF DESCRIPTION OF THE DRAWING

In the accompanying drawing:

FIG. 1 is a view in vertical section of the lower portion of a speed recorder assembly in a system embodying the invention, only so much of the recorder assembly being shown as is needed for a proper understanding of the invention;

FIG. 2 is a cross section through the central area of FIG. 1, showing a portion of the changeable gearing;

FIG. 3 is a fragmentary vertical section of the central portion of FIG. 1 showing a portion of the changeable gearing complementing that shown in FIG. 2;

FIG. 7 is a vertical section through the drive unit; and

FIG. 8 is a section on line 8—8 of FIG. 7.

DESCRIPTION OF PREFERRED EMBODIMENT OF THE INVENTION

Figure 5:
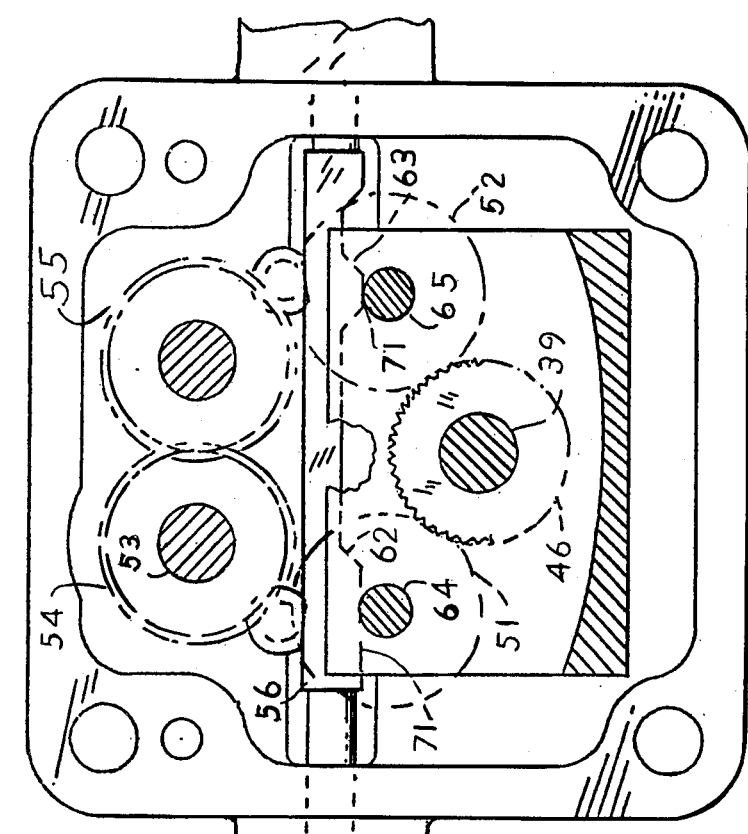
FIG. 5 is a view similar to that of FIG. 4, but showing the reverse frame in its neutral position.

The speed recorder system disclosed in the accompanying drawing as embodying the invention includes an hydraulic speed recorder assembly R (FIG. 1); only so much of the assembly as is needed to understand the invention is shown. The assembly is adapted to be mounted in the cab of a locomotive in a suitable location within ready view of the engineer. The recorder assembly is designed to be operated by means of torque power transmitted to it from a drive wheel of the locomotive through a drive unit D (FIGS. 7, 8) which is connected by means of a flexible drive shaft assembly S (FIGS. 1-8) with the recorder assembly.

The operating power for the recorder assembly may be taken from any selected drive wheel of the locomotive. The drive unit D (FIGS. 7, 8) is of a right angle drive transmission form. It includes a general housing 10 which is bolted to an end of the journal box 11 usually associated with the journal end of the axle 12 of the selected drive wheel, not shown. A drive input shaft 13 projecting from the housing of the drive unit is keyed, as at 14, into an end of the wheel axle 12 for rotation with the latter. A pinion 15 on the input shaft is engaged within the housing with a helical gear 16 carried by an output shaft 17. The latter is supported by appropriate bearings in the housing; and it projects externally from the housing at right angles to the input shaft so that the output shaft is parallel to the face of the drive wheel.

The flexible shaft assembly S includes a flexible steel wire drive shaft or cable 18 that is rotatable in a lubricated steel lined flexible cover or jacket 19. One end 21 of the cable is fastened to, or keyed in a slotted end of, the output shaft 17; and the corresponding end of the cable's jacket is secured, as by means of a terminal collar thereon and a collar nut 22 to a threaded bushing element of the housing of the drive unit. The opposite end of the cable is drivingly connected to an external depending terminal 23 of a primary input shaft 24 to the recorder assembly R; and the corresponding end of the cable's jacket is secured, as by means of a collar thereon and a collar nut 25, to a threaded bushing 26 depending from the bottom of the recorder assembly.

The input shaft 13 transfers to the drive unit D the exact R.P.M. of the drive wheel. The wheel R.P.M. is then reduced to a desirable low ratio, here 1.8 to 1 at the helical gears 15, 16 in the drive to the output shaft 17 and to the flexible cable 18. The resultant reduction of the wheel R.P.M. to the flexible cable serves to reduce stress on the latter. This tends to increase the cable life; and to decrease maintenance in this area.

The recorder assembly R includes an upper housing section or case 27, partially shown; and a lower housing section or gear box 28 bolted to the bottom of the case. The hydraulic speed recording mechanism 29, only partially shown (see FIG. 4), is housed in the case 27. It is the same as that disclosed in the earlier mentioned U.S. Pat. No. 2,210,154. Accordingly, it is not found necessary, nor is it needed for an understanding of the present invention, to repeat here the details of such mechanism.

The primary input shaft 24, to which cable 18 is connected, extends vertically into the gear box where it is supported in appropriate bearings. A helical gear 32 at the upper end of shaft 24 meshes at 90° with a helical gear 33 carried by an idler shaft 34. A splined end of shaft 34 projects through a sealed bearing into a change gear compartment 35 where a gear 36 is slidably splined thereon. Gear 36 meshes in compartment 35 with a drive pinion 36a that is slidably splined on an end of a stub shaft 34a. The latter is supported in appropriate bearing means.

The stub shaft 34a carries a helical gear 33a which meshes with a helical gear 32a at the lower end of a vertically extending secondary input shaft 39.

The gear train just described connecting the primary input shaft 24 with the secondary input shaft 39 is designed to return the R.P.M. drive at the recorder assembly to the basic operating speed based on 400 R.P.M. at 60 M.P.H.

Shaft 39 has swiveled thereon a reverse frame or bracket 41 of U-form (FIGS. 1, 4–6). The latter bracket is disposed in a horizontal plane. The swiveled mounting is defined by a bushing 42 fitted in a lower panel 43 of the frame; and by a second bushing 44 fitted in an upper panel 45 of the frame, through both of which bushings the shaft 39 extends. Pinned to shaft 39 and disposed between the panels 43, 45 of the reverse frame is a drive transmission gear 46. A spring load 47 presses the reverse frame downwardly relative to shaft 39 so that the upper panel 45 is frictionally engaged through a thrust bearing with the upper surface of the transmission gear 46.

Figure 4:
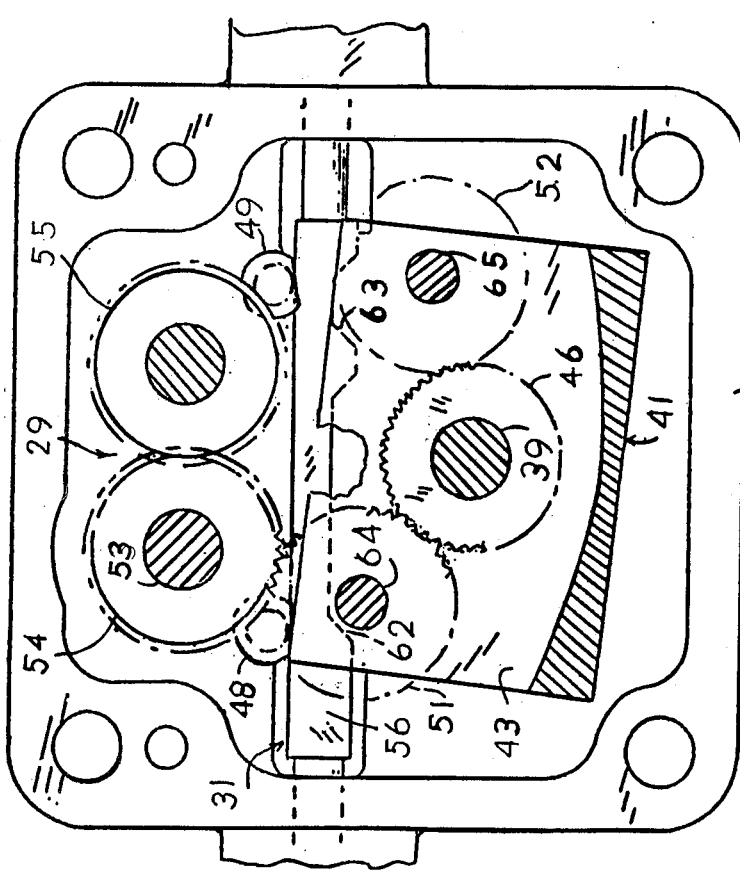
FIG. 4 is a top plan view of FIG. 1 with the upper case 27 removed from the lower housing portion 28; and showing the reverse frame in its clockwise position.
Figure 6:
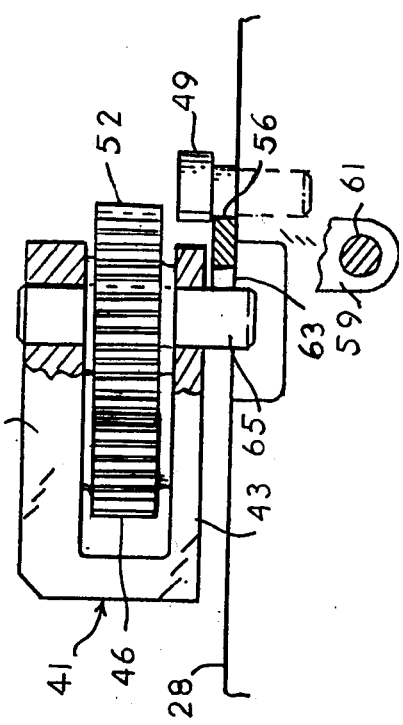
FIG. 6 is a detail in elevation of the right end of the reverse frame shown in FIG. 5.

By means of this arrangement, when forward drive is transmitted to shaft 39, the reverse frame 41 will be frictionally carried clockwise with it through a short angle until the lower panel 43 of the frame abuts a stop pin 48 in the housing, as in FIG. 4. A second stop pin 49 similarly limits the angular movement of the reverse frame when shaft 39 rotates in a reverse or counter-clockwise direction. However, limiting of the reverse frame against one or the other of the stops does not stop rotation of shaft 39. The latter will continue its rotation because of the continuous drive being transmitted to it from the drive wheel.

Pivotally mounted between the panels of the reverse frame, one to each side of the transmission gear 46 is a pair of idler gears 51 and 52, both of which are at all times drivably engaged by the transmission gear.

The primary function of the reverse frame 41 is to cause the drive of shaft 39 to be transmitted only in a forward direction to an intermediate shaft 53 which is part of and connected, as disclosed in the earlier mentioned U.S. Pat. No. 2,210,154, to drive the speed recorder mechanism 29. For this purpose, the intermediate shaft carries at its lower end an intermediate gear 54 which is at all times in mesh with an intermediate idler gear 55 of similar diameter.

The reversing frame 41 is capable of obtaining either of three positions. When a forward or clockwise drive is transmitted from the drive wheel and the connected gearing to shaft 39, the latter will swing the reverse frame frictionally to engage the gear 51 at its left with the intermediate gear 54, as in FIG. 4. This causes rotation of the recording intermediate shaft 53 in a corresponding clockwise direction. When a reverse or counter-clockwise drive is transmitted from the drive wheel and the connected gearing to shaft 39, the latter will swing the reverse frame frictionally in the opposite direction to engage the gear 52 at its right with the intermediate idler gear 55. This will also cause transmission of drive to the intermediate shaft 53 in a clockwise direction, even though the locomotive is then running in reverse.

Now, should the locomotive be arranged to run dead-head in a consist, it will be desired to discontinue the wheel drive to the recorder mechanism 29 so as to disable or deactivate the latter to a non-operating condition during the dead-head run period.

To this end, means is provided for centralizing the reverse frame 41 to a neutral third position (shown in FIG. 5) in which neither of the reverse frame gears 51, 52 will be engaged with the intermediate idler gear 55 or the intermediate gear 54 of the recording mechanism 29. This means includes a de-activator cam bar 56 which is pneumatically slidable to shift the reverse frame from either its clockwise or counterclockwise positions to its neutral position.

The cam bar (as best seen in FIGS. 1, 4–6) underlies the lower panel 43 of the reverse frame. It has a depending flange 57 at one end fixed to a pneumatically operable piston 58; and it has a similar flange 59 at its other end fixed to a spring operable return plunger 61. The bar has along its inner edge a pair of cam surfaces 62, 63. When the reverse frame is in its clockwise (FIG. 4) position, a lower end of the idler gear pin 64 will be positioned in the path of cam 62; and when the reverse frame obtains its counter-clockwise position, a lower end of the idler gear pin 65 will be positioned in the path of cam 63.

The cam bar 56 is operable in response to energization of a solenoid control valve 66 (FIGS. 2, 3). The latter controls flow of operating air from an inlet port 67 to a passage 68 leading through a port 69 (FIG. 1) to a chamber at the back of piston 58.

Following energization of the control valve 66, the piston shifts the cam bar a pre-determined distance to the right (FIG. 5). In this movement of the cam bar one or the other of its cam surfaces 62, 63 will act against that idler pin 64 or 65 which then happens to be in its path so as to swing the reverse frame to its centralized or neutral position, as in FIG. 5. As the reverse frame obtains its centralized position, the lower ends of both of the idler pins 64, 65 will be backed by inner straight edge portions 71 of the cam bar. When this occurs and as long as the solenoid control valve is held energized, the reverse frame will be locked from swinging to either of its other positions. During the time the reverse frame is in its neutral or centralized (FIG. 5) position, the recording mechanism 29 is de-activated or disconnected from the locomotive wheel drive and accordingly is not operating.

When the solenoid valve 66 is de-energized, air trapped at the back of piston 58 vents through the solenoid valve in conventional manner and allows the plunger 61 under the force of its spring to return the cam bar to its normal inactive (FIG. 4) position. The reverse frame will, however, retain its centralized position until reverse or forward drive from the locomotive wheel is again transmitted to shaft 39 to frictionally swing the reverse frame to one of its angular positions to impart wheel drive to the recorder mechanism.

It is to be noted that the air passage 68 connecting with the solenoid valve is common to both the piston and plunger chambers respectively through end ports, 69, 70, but air is normally blocked from entering port 70 to the plunger chamber by the body of the cap 60 that closes over the end of the plunger chamber.

It is to be noted that the piston and plunger chambers are similar. This enables the assemblies therein to be reversed from one chamber to the other. It can be seen that when the positions of the plunger and piston assemblies have been reversed from that shown in FIG. 1, the cam bar will be moved by the spring loaded plunger to the right so as to maintain the reverse frame normally in its centralized position. Accordingly, when the assemblies are thus reversed, the solenoid valve must be energized to enable the reverse frame to return the recorder system to operating condition.

It is also apparent that by removing the solenoid valve 66 and substituting in its place a suitable plug, not shown, a suitable external air signal source may be connected to operate the piston.

The gear ratio reduction of 1.8 to 1 was designed into the drive unit D to reduce the speed of the flexible cable 18 so as to effect an increase in the life of the cable. But, since the speed recorder's operating speed is based on 400 R.P.M. at 60 M.P.H. it is necessary for a proper recording to return to the proper R.P.M. at the speed recorder beyond the flexible cable. This is accomplished by a combination of changeable gears in the gear change compartment 35, whereby drive is transmitted at the proper R.P.M. from the primary input shaft 24 to the secondary input shaft 39.

The combination of gears in the gear change compartment comprises the pinion gear 36a and the driver gear 36. This compartment is suitably sealed to maintain it free of lubrication; and it has a cover 72 removably bolted over the compartment. The removable cover allows easy access of the operator to the gears for replacement when necessary to compensate for wear at the locomotive drive wheel.

The changeable gears 36 and 36a are replaced in accordance with a wheel wear compensating chart. They are simply slipped off their respective shafts and replaced with a new set. For each predetermined degree of wear a separate set of properly matched gears may be selected to replace those presently in the compartment. Each drive gear 36 and pinion 36a has its respective number of teeth stamped into its face. The drive gear 36 is of a color different from that of pinion 36a so that the correct set or combination can always be selected and checked against the chart. The drive gear 36 is colored white, and is formed of nylon plastics; the pinion gear 36a is colored black and is also of a suitable plastics material, such as that known in the trade as Celcon.

The color enables the pinion gear 36a to be readily distinquished from the driver gear 36. To ensure against any error being made in locating the changeable gears on their respective shafts, the drive gear 36 is formed with a similar hub at each end (see FIG. 2), and the cover 72 is formed with a recess 73 (FIG. 2) to receive one of these hub ends. If the driver gear is erroneously positioned upon the wrong shaft, an unrecessed or solid inner surface of the cover will abut the hub so as to prevent the cover from being closed.

Because of the desire to maintain the gear change compartment free of lubrication, the changeable gears 36 and 36a, are formed of a suitable plastics material having an inherent greasy nature.

We claim:

1. A speed recorder system comprising a speed recorder assembly having a primary input shaft, a drive unit having an input drive shaft connectible to an axle of a drive wheel of a locomotive, an output shaft from the drive unit, speed reduction gearing connecting the input drive shaft with the output shaft at an angle of 90°, a flexible drive cable connecting the output shaft with the primary input shaft, means to operatively disconnect the output shaft from the flexible drive cable, speed recording mechanism in the recorder assembly, and changeable gearing drivingly connecting the primary input shaft to the recording mechanism at a gear ratio selected to compensate for the R.P.M. reduction at the drive unit and to correct for a specific wheel diameter of the locomotive.

2. A speed recorder system as in claim 1, wherein the changeable gearing drivingly connecting the primary shaft to the recording mechanism is located in a compartment of the housing of the recorder assembly, and a removable cover over the compartment allows easy access to the changeable gearing for replacement thereof.

3. A speed recorder system as in claim 2, wherein the changeable gearing comprises a set of two changeable gears, a predetermined degree of wear of the drive wheel affects the accuracy of speed transmission through the said changeable gears to the recording mechanism, and a separate set of two changeable gears matching the said degree of wear of the drive wheel is provided for replacing the set of changeable gears then in the compartment.

4. A speed recorder system as in claim 3, wherein each of the changeable gears is slidably mounted upon a separate supporting shaft and slidably removable therefrom, and wherein one of the changeable gears is of one color and the second changeable gear is of another color.

5. A speed recorder system as in claim 4, wherein one of the changeable gears has an identical hub formation at each end one of which is receivable in a complementary recess of the cover only when the said second gear is received upon its proper supporting shaft.

6. A speed recorder system as in claim 4, wherein the compartment in which the changeable gears are located is lubrication free, and each of the changeable gears is formed of a plastics material having an inherent greasy nature.

7. A speed recorder assembly including an input shaft connectible with a drive wheel of a locomotive and adapted to rotate forwardly or reversely accordingly as the wheel rotates, an intermediate shaft for driving recording mechanism, and drive transmission means responsive to either forward or reverse rotation of the input shaft to translate such rotation into forward rotation of the intermediate shaft, the drive transmission means comprising an intermediate pinion on the intermediate shaft, an intermediate idler gear meshed with the intermediate pinion, a drive transmission gear fixed to the input shaft, a reverse frame swiveled upon the input shaft adapted to be frictionally carried angularly by the input shaft, a first idler gear mounted on the frame engaged with the drive transmission gear, a second idler gear mounted on the frame also engaged with the drive transmission gear, the frame having limited angular movement frictionally with the input shaft in a forward direction to carry the first idler gear into engagement with the intermediate gear, the frame having limited angular movement frictionally with the input shaft in a reverse direction to carry the second idler gear into engagement with the intermediate idler gear, and shiftable cam bar means for shifting the frame angularly relative to the input shaft to a neutral position in which the first and second idler gears are respectively clear of the intermediate gear and the intermediate idler gear and for simultaneously restraining the frame in such neutral position against being frictionally rotated from such position by the input shaft.

8. A speed recorder assembly as in claim 7, wherein a spring load engages the frame frictionally with the input shaft for rotation with the latter.

9. A speed recorder assembly as in claim 7, wherein the first idler gear is mounted upon a first idler pin in the frame, the second idler gear is mounted upon a second idler pin in the frame, the cam bar has first and second cam surfaces on an inner edge thereof, the first idler pin has a position fronting the first cam surface after the frame has been angularly carried in a forward direction, said first cam surface being cooperable with the first idler pin to cam the frame about the input shaft to its neutral position when the cam bar is shifted in a selected direction.

10. A speed recorder assembly as in claim 9, wherein the second idler pin has a position fronting the second cam surface after the frame has been angularly carried in a reverse direction, and said second cam surface is cooperable with the second idler pin to cam the frame about the input shaft to its neutral position when the cam bar is shifted in said selected direction.

11. A speed recorder assembly as in claim 10, wherein the cam bar has a pair of straight portions along its inner edge, each adapted to obtain a position backing a separate one of the first and second idler pins as the cam bar is shifted in said selected direction and as the frame obtains its neutral position.

12. A speed recorder assembly as in claim 11, wherein the cam bar is pneumatically shiftable in said selected direction against the bias of a return spring load.

* * * * *